Dec. 6, 1938.   P. J. F. GALLAGHER   2,139,186
HEADLIGHT
Filed July 6, 1937   2 Sheets—Sheet 1
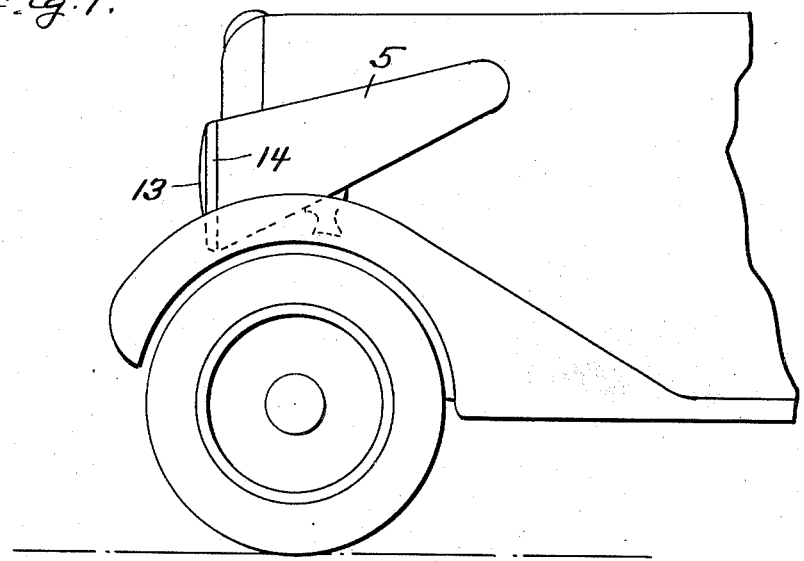
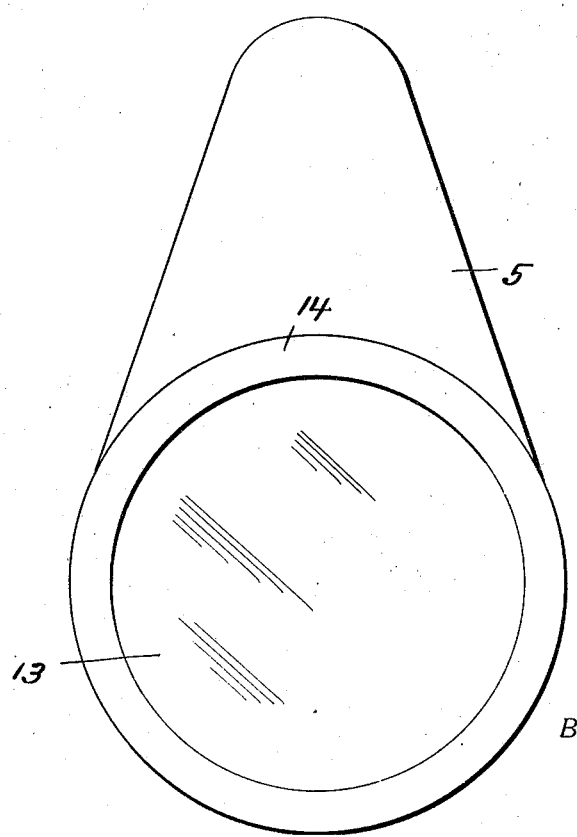
Inventor
Patrick J. F. Gallagher
By Clarence A. O'Brien
Hyman Berman
Attorneys Dec. 6, 1938.　　　P. J. F. GALLAGHER　　　2,139,186
HEADLIGHT
Filed July 6, 1937　　　2 Sheets-Sheet 2
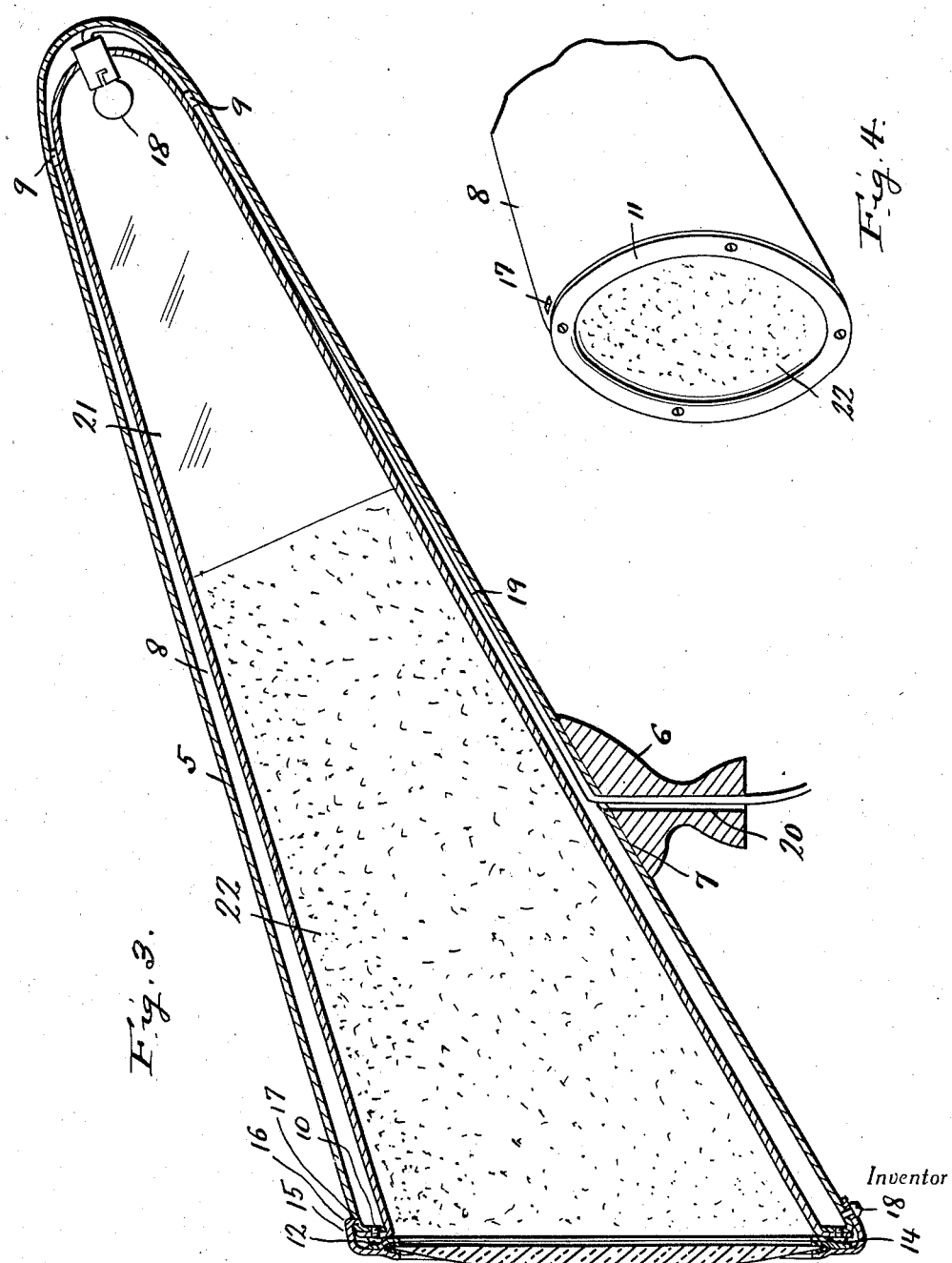
Patrick J. F. Gallagher
Inventor
By Clarence A. O'Brien
Hyman Berman
Attorneys Patented Dec. 6, 1938

2,139,186

UNITED STATES PATENT OFFICE 2,139,186

HEADLIGHT

Patrick J. F. Gallagher, Marlborough, N. Y.

Application July 6, 1937, Serial No. 152,168

1 Claim. (Cl. 240—41.35)

This invention relates to new and useful improvements in headlights provided for automobiles and pertains particularly to means for distributing the projected light.

It is desirable in headlights for vehicles to so distribute the light over the field to be illuminated that the intensity is greatest in the immediate path of travel and less intense over the field adjacent thereto, it being particularly desirable that the light rays be so projected that pedestrians, drivers and others in the roadway will not be blinded by the glare of the light, and when driving in fog, the operator of the vehicle will also not be blinded as is the fault with headlights of present day construction.

The invention together with its objects and advantages will be best understood from a study of the following description taken in connection with the accompanying drawings wherein:

Figure 1 is a side elevational view illustrating the application of the headlight to an automobile.

Figure 2 is a front elevational view of the headlight.

Figure 3 is a longitudinal sectional view through the headlight and

Figure 4 is a fragmentary perspective of the foreward or open end of the reflector.

Referring to the drawings by reference numeral it will be seen that in the preferred embodiment thereof the improved headlight comprises an elongated casing 5 that is substantially conical, with the open front end of the casing disposed on a bias.

To support the headlight casing 5 on the vehicle at an incline, and with the rear or closed end of the headlight casing disposed upwardly there is provided a suitable bracket 6, the head of which is chamfered to provide an inclined seat 7 for the headlight casing. Arranged within the headlight casing 5 and spaced from the wall thereof is a reflector 8 that is identical in shape and form with the casing 5 and is held in spaced relation to the walls of the casing through the medium of spacer elements 9 arranged adjacent the inner end of the casing 5 and a continuous circular flange 10 provided at the open end of the casing 5.

At its open end the reflector 8 is provided with an outstanding apertured flange 11 through the medium of which and screws 12 the reflector is positively secured in position within the headlight casing.

Mounted at the forward open end of the lamp casing is a suitable lens 13 set in a protective frame 14 of rubber and secured in position through the medium of a lens retaining frame 15 that is secured in position on the headlight casing through the medium of a lug 16 that engages a slot 17 in the top of the casing 5 and suitably spaced screws 18.

Mounted in the inner end of the reflector 8 is an incandescent lamp 18 and the wire for the lamp 18 is indicated by the reference numeral 19 and is accommodated in the space between the casing 5 and reflector 8, extending through a suitable hole or bore 20 provided therefor in the supporting post or bracket 6.

The rear portion of the reflector 8 is provided interiorly with a reflecting surface 21 while the forward portion of the reflector 8 from the reflecting surface 21 to the forward open end of the reflector is provided with a non-reflecting surface 22, and in this connection it will be understood that the non-reflecting surface 22 is provided by painting the interior of the reflector with a suitable substance colored either pale yellow, cream or lemon so that the non-reflecting surface will be bright enough as not to offset the light beam, but at the same time preclude such glare as would tend to blind the driver of an approaching vehicle or would render the illumination of the lamp while driving in fog undesirable.

It will be further appreciated by having the lamp mounted so as to slope downwardly and forwardly the rays from the lamp will be so distributed over the field to be illuminated that the intensity is greatest in the immediate path of the travel and less intense over the field adjacent thereto, the rays being so projected that pedestrians, drivers and others in the roadway will not be blinded by the glare of the light, the rays being projected downwardly and forwardly, with the result that while the road in front of the automobile will be adequately lighted glare in front of and at the side of the line of the vertical center of the headlight will be averted.

From the above it will also be appreciated that I have provided a lamp constructed on such lines that presents a simple and inexpensive lamp structure, and further that the lamp of the invention is practical and especially efficient by eliminating glare from the eyes of the operator of an approaching vehicle.

What is claimed is:—

A headlight comprising an elongated casing of substantially conical shape and having the front open end thereof formed on a bias, an annular flange formed on the open end of the casing and arranged inwardly of the latter, a reflector of a shape corresponding to the shape of the casing and of a diameter and length to be located in the casing and spaced therefrom, an annular flange formed on the reflector and overlapping the flange of the casing and detachably secured thereto, spacers arranged between the casing and reflector and located adjacent the inner end of the reflector to cooperate with the flanges in supporting the reflector in spaced relation to the casing, a coating applied to said reflector and extending approximately one-half the length of the latter and from the open end thereof towards the closed end of said reflector to render approximately one-half of the reflector non-reflecting of light rays, means for supporting the casing at an inclination with the open end thereof disposed lowermost, a lens frame of cushion material abutting the flange of the reflector, means for detachably securing the frame on the casing and in abutting engagement with the last-named flange, and a lens carried by said frame.

PATRICK J. F. GALLAGHER.